W. H. COLDWELL.
MOTOR LAWN MOWER.
APPLICATION FILED JULY 3, 1914.

1,138,730.

Patented May 11, 1915.
2 SHEETS—SHEET 1.

Witnesses:
John E. Prager
A. Worden Gibbs.

William H. Coldwell Inventor
By his Attorneys
Whitaker Prevost

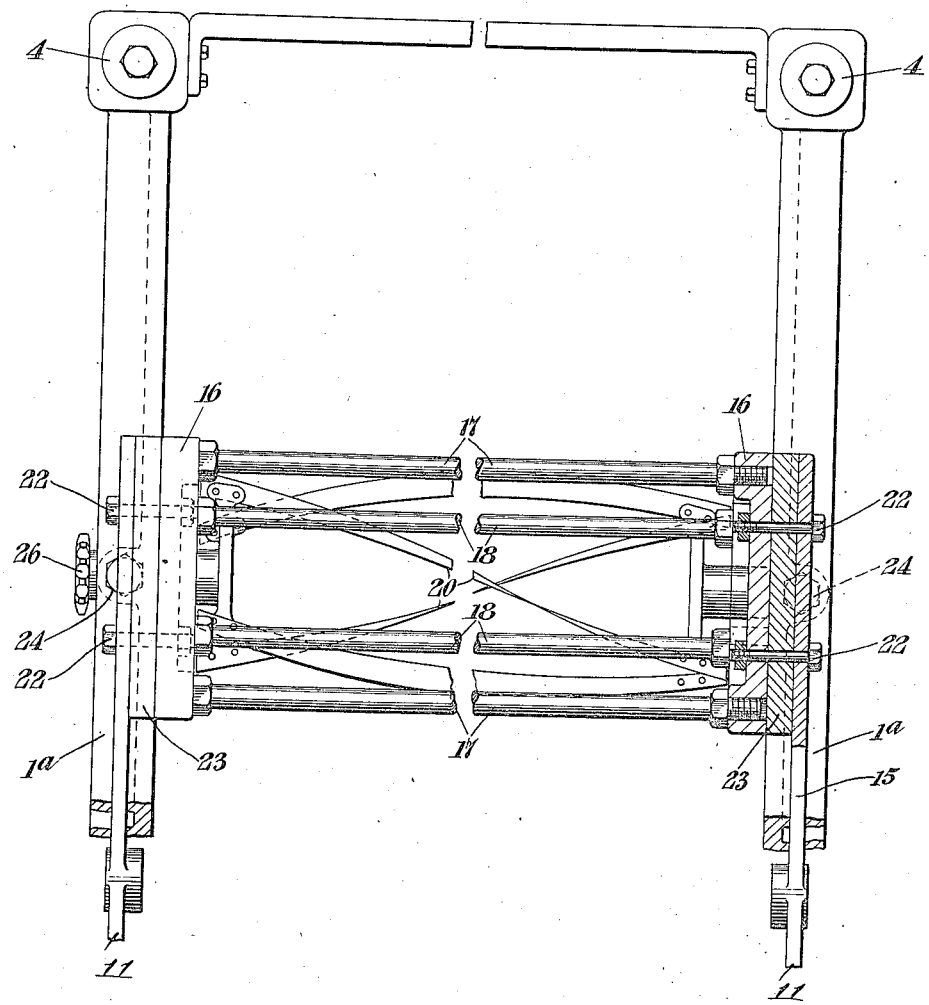

UNITED STATES PATENT OFFICE.

WILLIAM HERBERT COLDWELL, OF NEWBURGH, NEW YORK.

MOTOR LAWN-MOWER.

1,138,730.  Specification of Letters Patent.  Patented May 11, 1915.

Application filed July 3, 1914. Serial No. 848,771.

*To all whom it may concern:*

Be it known that I, WILLIAM H. COLDWELL, a citizen of the United States, residing at Newburgh, in the county of Orange and State of New York, have invented certain new and useful Improvements in Motor Lawn-Mowers; and I do hereby declare the following to be a full, clear, and exact description of the invention, such as will enable others skilled in the art to which it appertains to make and use the same.

My invention consists in the novel features hereinafter described reference being had to the accompanying drawing which illustrates one embodiment of my invention selected by me for purposes of illustration and the said invention is fully disclosed in the following description and claims.

Figure 1:
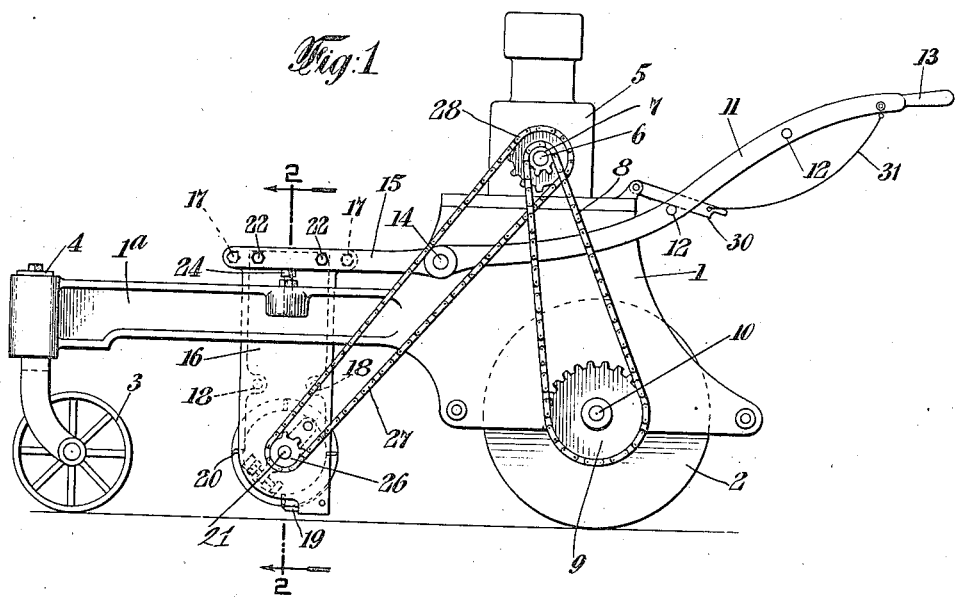
Figure 2:
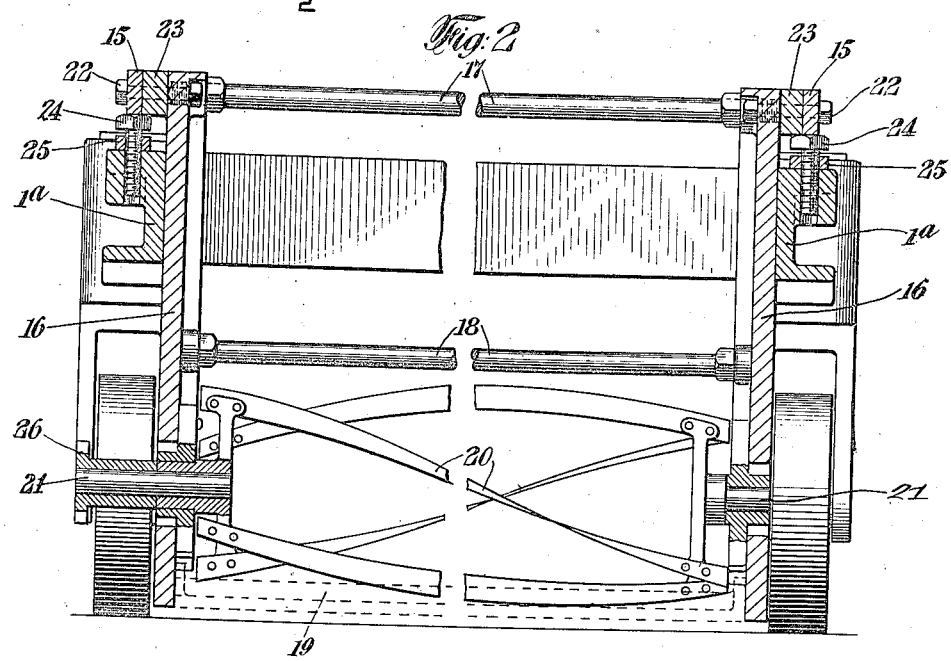

Referring to the said drawings, Figure 1 represents a side elevation of a motor lawn mower having my present invention embodied therein. Fig. 2 represents a vertical transverse sectional view on line 2—2 of Fig. 1, looking toward the front of the machine, as indicated by the arrows in that figure. Fig. 3 is a top plan view of the front portion of the machine, parts being shown in section.

My invention relates to the type of motor lawn mower in which the apparatus is controlled and steered by an operator who walks behind the machine. In this class of machines rearwardly projecting handles are ordinarily provided which are grasped by the operator and by means of these handles the machine may be steered to the right or left, the forward end of the machine being ordinarily provided with caster wheels to facilitate the steering of the machine, the rear portion of the machine being supported upon lawn rolling traction rollers to which power is transmitted from a motor usually of the gasolene explosive type, supported on the frame work of the machine above the rollers. The machines are provided with the usual cutting mechanism, consisting of a stationary knife and a rotary cutter, the latter being driven preferably from the motor. In this class of machines, it is frequently necessary to raise the forward portion of the machine carrying the cutting mechanism to permit the cutting mechanism to pass over a rock, stick, or other obstacle or projection to avoid injury to the cutting mechanism and as these machines are ordinarily constructed, it is necessary for the operator to exert a sufficient downward pressure on the steering handles to raise the entire forward part of the machine, including the caster wheels, the front portion of the frame, and the cutting mechanism, and a part of the weight of the motor. The torque of the engine or motor in driving the traction rollers exerts an upward pressure on the forward end of the machine, and the motor is so balanced over the traction rollers that there shall be sufficient pressure on the caster wheels to keep them in proper engagement with the ground when the motor is driving the machine, and to prevent the machine tipping over backward in climbing an incline. It therefore requires considerable strength to lift the cutter to pass over an obstacle, and if the machine is moving down a grade so that a larger portion of the weight of the engine or motor and its supporting frame is thrown forward, it may become difficult or impossible for the operator to overcome these various resistances and elevate the rotary cutter so as to avoid injury thereto.

The object of my invention is to overcome this difficulty by mounting the cutting mechanism so that it is capable of moving vertically independently of the main frame of the machine, and to pivotally connect the steering handles to the main frame forward of the axis of the traction rollers, and to connect said handles to the cutting mechanism so that when the handles are depressed, the cutting mechanism alone may be elevated to avoid an obstacle without elevating the front end of the machine, and at the same time keeping the weight of the cutter frame upon the forward portion of the main frame, forward of the axis of the traction rollers, so as to prevent the machine from tipping over backward. In this connection I also prefer to provide means for detachably supporting the cutting mechanism, which is preferably of the demountable cutter unit type, with respect to the machine, and also to provide means for securing the vertical adjustment of the cutting mechanism with respect to the main frame to regulate the height of cut.

In the accompanying drawings, I have shown one embodiment of my invention which I have selected for the purpose of illustrating the same, in which 1 represents the main frame of the motor lawn mower provided at its rear end with traction lawn rolling rollers 2, and at its forward end with caster wheels 3, having a vertically pivotal connection at 4 with the front portions of the main frame, in the usual manner. The traction rollers are preferably provided with the usual differential gearing (not shown) and are operatively connected with a motor 5 mounted on the main frame, which is preferably a gasolene explosive engine of any desired type. In this instance, the engine shaft 6 is shown as provided with a driving sprocket 7 connected by a sprocket chain 8 with a sprocket 9 on the roller shaft 10, for imparting rotary motion to the rollers 2, and it will be understood that any desired form of clutch mechanism may be interposed between the engine and said rollers, and other suitable forms of gearing may be substituted for the sprocket chain herein illustrated.

The machine frame is provided with a pair of rearwardly extending handle bars 11—11 which are preferably united by cross rods 12 or other suitable transverse braces for joint movement, and are provided at their rear ends with hand engaging portions 13. The said handle bars are pivoted to the main frame at 14 in Fig. 1, preferably well forward of the axis of the traction rollers, and each of said handle bars is provided with a forwardly extending arm 15 to which the cutting mechanism is connected. The cutting mechanism is preferably of the demountable unit type, such as is covered by my former Letters Patent of the U. S. No. 1,039,490 dated Sept. 24, 1912, and No. 1,043,507 dated Nov. 5, 1912, that is to say, the cutting mechanism is capable of being removed intact from the machine without disturbing the relation between the stationary knife and rotary cutter and to this end the cutting mechanism comprises a pair of side plates or frames 16—16 strongly braced and held together by means of suitable transverse tie-rods as 17—17 and 18—18, and these plates 16—16 carry the stationary knife 19 and the bearings in which the shaft or shafts 21 of the rotary cutter 20 is or are mounted. The cutter unit is provided with any usual form of adjusting mechanism for adjusting the relative positions of the stationary knife and rotary cutter in a well known way and it will be seen that the cutter unit frame is entirely separate from the main frame of the machine and may be inserted in and removed from the main frame without effecting the adjustment of the parts of the cutting mechanism.

The cutter unit frame is movably supported with respect to the main frame and connected with the handle bars so that it may be raised and lowered with respect to the main frame by the said handle bars. In this instance I have shown the cutter unit frame rigidly but detachably secured to the forwardly extending arms 15 of the handle bars by means of suitable bolts 22, spacing blocks 23 being in this instance inserted between the side plates 16 and the arms 15, as shown in Figs. 2 and 3. The vertical position of the cutter frame is determined in this instance by adjustable stops or vertically disposed screws 24—24, engaging threaded apertures in the side bars 1ᵃ of the main frame 1, and being provided with set nuts 25—25 for locking them in their adjusted positions. These stop screws 24 are so located as to support the forwardly extending arms 15 of the handle bars, as shown in Figs. 1 and 2 and hold the cutting mechanism at the desired height from the ground. By adjusting the screws 24—24, the height of cut can be regulated when desired, and the weight of the cutter unit will always maintain it in position with the arms 15 resting firmly on the screws 24. Suitable means are provided for driving the rotary cutter, preferably from the motor 5, and in this instance the shaft 21 of the rotary cutter is provided with a sprocket 26, which is connected by a sprocket chain 27 with a driving sprocket 28 mounted on or connected with the engine shaft, suitable clutch mechanism (not shown) being provided for connecting and disconnecting the engine from the rotary cutter. I prefer to so arrange the cutter driving mechanism and the pivotal connections 14 for the handle bars, that the handle bars may be depressed at their rear ends to elevate the cutting mechanism to permit it to pass over an obstacle without materially affecting the driving connections between the motor and the rotary cutter. In this instance I have shown the pivotal connections 14 located substantially in a line with the axis of the rotary cutter and the driving sprocket 28 so that the sprocket chain will not be affected by the upward swing of the cutting mechanism to any material extent.

It will be seen that in the construction herein shown and described, the operator will walk behind the machine with his hands on the handle bars and that he can readily steer the machine while it is in motion by means of the handle bars. In case the cutting mechanism approaches a stone or other obstacle the operator will depress the rear ends of the handle bars and raise the cutter unit only, thereby transferring its weight to the pivotal connections 14, the forward end of the machine being supported by the caster wheels at all times, and supporting the weight of the cutter frame even when the latter is in raised position. As soon as the obstacle is passed, the handle bars are permitted to rise at their rear ends, thus lowering the forward extensions 15 into contact with the adjustable stops 24 and restoring the cutting mechanism to operative position, where it is continually maintained under normal conditions by its own weight.

It will be noted that when the handles are depressed and the cutter unit raised, while the weight of the cutter unit is transferred back to the pivotal connections of the handles, a considerable amount of pressure, approximately equal to the weight of the cutter unit, is applied by the operator to the handles in order to raise the cutter unit, and this weight, in addition to that of the cutter unit, is applied to the frame at the pivotal connections 14 of the handles, which pivotal connections are forward of the additional downward pressure exerted by the operator, compensates for the transfer of the weight of the rotary cutter rearwardly to the pivotal connections when the cutter is raised, so that substantially the same weight is carried by the front portion of the frame forward of the axis of rotation of the rollers, whether the cutter unit is in its raised or lowered position, and therefore there is no liability of the front portion of the frame to be lifted off the front or of the frame to tilt over backward, which might be the case where a considerable amount of weight actually removed from the front of the machine was transferred to a point in rear of the axis of rotation of the rollers. It will also be seen that the downward pressure on the handle bars does not affect the main frame and motor at all and has no tendency whatever to tip it rearwardly.

In some instances I prefer to provide means for maintaining the cutter unit in elevated position in order to protect the cutting mechanism, for example, in moving the machine from one place to another under its own power, and in the drawings Fig. 1, I have shown an arm or trigger 30, pivotally mounted on the rear end of the frame at one or both sides of the machine and adapted to engage a part connected with the handle bars, for example, in the present instance, one of the cross bars 12, when the handle bars are depressed to lock them in such position as to hold the cutter unit elevated, and I also prefer to provide suitable means, as a cord or other flexible connection 31 extending from such arm or arms, to a point adjacent to the hand engaging portions 13, so that said arms or triggers may be readily disengaged to permit the cutter unit to be lowered into its operative position when desired.

It will also be seen that in case it is desired to remove the demountable cutter unit, as for example, to send it to the factory for repairs, or for sharpening, or other purposes, it is only necessary to remove the bolts 22 when the entire cutter unit can be removed by throwing off the chain 27, leaving the stationary knife and rotary cutter in their adjusted relation. In some instances, a machine may be equipped with two demountable cutter units so that in case of accident to one cutter unit, the other may be placed in the machine and used, while the first is repaired.

What I claim and desire to secure by Letters Patent is:—

1. In a lawn mower, the combination with a main frame, provided with rotary supporting devices and steering handles movably connected to said frame for steering the same, of a separate cutter frame movable vertically with respect to the main frame, and operatively connected with said movable steering handles, and cutting mechanism carried by said separate frame, whereby the cutting mechanism may be elevated to pass an obstacle by said steering handles, without raising any portion of the main frame.

2. In a lawn mower, the combination with a main frame, rotary supporting devices therefor, and rearwardly projecting steering handles pivotally connected to said main frame, of a separate cutter frame movable bodily vertically with respect to the main frame, said cutter frame being connected to said pivotal steering handles, said cutter frame and main frame being provided with co-acting parts for supporting the cutter frame when in its lowermost position at a predetermined distance from the ground.

3. In a lawn mower, the combination with a main frame, rotary supporting devices therefor, and rearwardly projecting steering handles pivotally connected to said main frame, of a separate cutter frame movable bodily vertically with respect to the main frame, said cutter frame being connected to said pivoted steering handles, said cutter frame being provided with parts for engaging parts connected with the main frame to support the cutter frame upon the main frame when in its lowermost position, the parts connected with one of said frames being adjustable to vary the height of cut.

4. In a lawn mower, the combination with a main frame, rotary supporting devices therefor, and rearwardly projecting steering handles pivotally connected to said main frame, of a separate cutter frame movable bodily vertically with respect to the main frame, said cutter frame being connected to said pivoted steering handles, vertically adjustable supporting devices on the main frame, and devices connected with the cutter frame adapted to engage and rest upon said adjustable devices to support the cutter frame when in its lowermost position and regulate the height of the cut.

5. In a lawn mower, the combination with a main frame, rotary supporting devices therefor, and steering handles pivotally connected with the main frame and having rearwardly extending portions, said steering handles having portions extending forwardly on their pivotal connections, of a demountable cutter unit comprising a stationary knife, a rotary cutter and a frame separate from the main frame, and provided with means for holding the rotary cutter and stationary knife in operative relation, said cutter unit being detachably secured to the forwardly extending portions of the steering handles, and means for limiting the movement of said cutter unit downwardly with respect to the main frame, whereby the weight of the cutter unit will be supported by the main frame, and whereby the cutter unit may be raised by the steering handles without elevating the main frame.

6. In a motor lawn mower, the combination with a main frame, lawn rolling traction rollers supporting said frame at one end, and caster wheels supporting the said frame at the other end, steering handles pivotally connected with said main frame having hand engaging portions extending rearwardly from their pivotal connections, and having elevating arms extending forwardly of their pivotal connections, of a demountable cutter unit comprising a stationary knife, a rotary cutter, and a frame separate from the main frame for holding the stationary knife and rotary cutter in fixed relation with each other, said cutter unit being detachably secured to the elevating arms of the steering handles, co-acting parts connected with said main frame and cutter unit for normally supporting the cutter unit on the main frame when the cutter unit is in its lowermost position, a motor carried by the main frame, driving connections between the motor and said traction rollers, and driving connections between the motor and the rotary cutter.

7. In a motor lawn mower, the combination with a main frame, lawn rolling traction rollers supporting said frame at one end, and caster wheels supporting the said frame at the other end, steering handles pivotally connected with said main frame, having hand engaging portions extending rearwardly from their pivotal connections, and having elevating arms extending forwardly of their pivotal connections, of a demountable cutter unit comprising a stationary knife, a rotary cutter, and a frame separate from the main frame for holding the stationary knife and rotary cutter in fixed relation with each other, said cutter unit being detachably secured to the elevating arms of the steering handles, co-acting parts connected with said main frame and cutter unit for normally supporting the weight of the cutter unit on the main frame when the cutter unit is in its lower most position, a motor carried by the main frame, driving connections between the motor and said traction rollers, and driving connections between the motor and the rotary cutter, constructed to permit the vertical movement of the cutter unit on the axis of the pivotal connections of said steering handles without disengaging said cutter driving connections.

8. In a motor lawn mower, the combination with a main frame, lawn rolling traction rollers supporting said frame at one end, and caster wheels supporting the said frame at the other end, steering handles pivotally connected with said main frame, having engaging portions extending rearwardly from their pivotal connections, and having elevating arms extending forwardly of their pivotal connections, of a demountable cutter unit comprising a stationary knife, a rotary cutter, and a frame separate from the main frame for holding the stationary knife and rotary cutter in fixed relation with each other, said cutter unit being detachably secured to the elevating arms of the steering handles, co-acting parts connected with said main frame and cutter unit for normally supporting the weight of the cutter unit on the main frame when the cutter unit is in its lowermost position, a motor carried by the main frame, driving connections between the motor and said traction rollers, a driving gear connected with the rotary cutter, a driving gear member for the rotary cutter operatively connected with the motor, and connections between said driving gear members, the pivotal connections of said steering handles being substantially in line with the axes of said connected driving gear members.

9. In a lawn mower, the combination with a main frame, traction rollers supporting said frame at its rear end, and rotary devices supporting said frame adjacent to its forward end, a motor carried by the main frame, a separated cutter frame, normally supported on the main frame forward of the axis of the traction rollers, and movable vertically with respect to the main frame and carrying the cutting mechanism, steering handles for the main frame, and connections between the main frame, the cutter frame, and steering handles for enabling the steering handles to elevate the cutter frame with respect to the main frame, said connections engaging the main frame forward of the axis of the traction rollers, whereby the weight of the cutter frame will be at all times upon the main frame forward of the axis of the traction rollers.

10. In a lawn mower, the combination with a main frame, traction rollers supporting said frame at its rear end, and rotary devices supporting said frame adjacent to its forward end, a motor carried by the main frame, a separate cutter frame, normally supported on the main frame forward of the axis of the traction rollers, and movable vertically with respect to the main frame and carrying the cutting mechanism, steering handles for the main frame, pivotally connected to the main frame forward of the axis of the traction rollers, and connections between the steering handles and the cutter frame for elevating the cutter frame with respect to the main frame without removing the weight of the cutter frame from the forward portion of the main frame.

11. In a lawn mower, the combination with a main frame, provided with rotary supporting devices and steering handles movably connected to said frame for steering the same, of a separate frame movable vertically with respect to the main frame, and operatively connected with said movable steering handles, cutting mechanism carried by said separate frame, whereby the cutting mechanism may be elevated to pass an obstacle by said steering handles, without raising any portion of the main frame, and means for locking the cutting mechanism in its elevated position.

12. In a lawn mower, the combination with a main frame, provided with rotary supporting devices and steering handles movably connected to said frame for steering the same, of a separate frame movable vertically with respect to the main frame, and operatively connected with said movable steering handles, cutting mechanism carried by said separate frame, whereby the cutting mechanism may be elevated to pass an obstacle by said steering handles, without raising any portion of the main frame, and locking devices secured to the main frame and adapted to engage the parts connected with the handles for locking the cutting mechanism in elevated position.

13. In a lawn mower, the combination with a main frame, provided at one end with rotary traction devices and at the other end with ground engaging supporting devices, of a separate cutter frame movable vertically with respect to the main frame, a steering handle pivotally connected with the main frame, and operatively connected with the vertically movable cutter frame, and cutting mechanism carried by said cutter frame, whereby the cutter frame and cutting mechanism may be elevated without raising any portion of the main frame.

14. In a motor propelled lawn treating machine, the combination with a main frame provided with rotary traction and supporting devices, a motor carried by the main frame, driving connections from the motor to the traction devices, a steering handle pivotally connected to the main frame, and having rearwardly extending hand engaging portions for steering the machine, and forwardly extending portions provided with means for detachably securing them to a demountable lawn treating unit, of a demountable lawn treating unit comprising a separate frame, and lawn treating mechanism, including a rotary part carried by said separate frame, said main frame being provided with supporting portions for supporting the demountable lawn treating unit when in its lowest position, and power connections from the motor for driving the rotary part of said lawn treating unit.

In testimony whereof I affix my signature in the presence of two witnesses.

WILLIAM HERBERT COLDWELL.

Witnesses:
W. J. WEEKES,
EDWIN T. SMITH.